Jan. 2, 1951 — R. B. CROSSET — 2,536,125
WEIGHING FUNNEL
Filed May 19, 1948
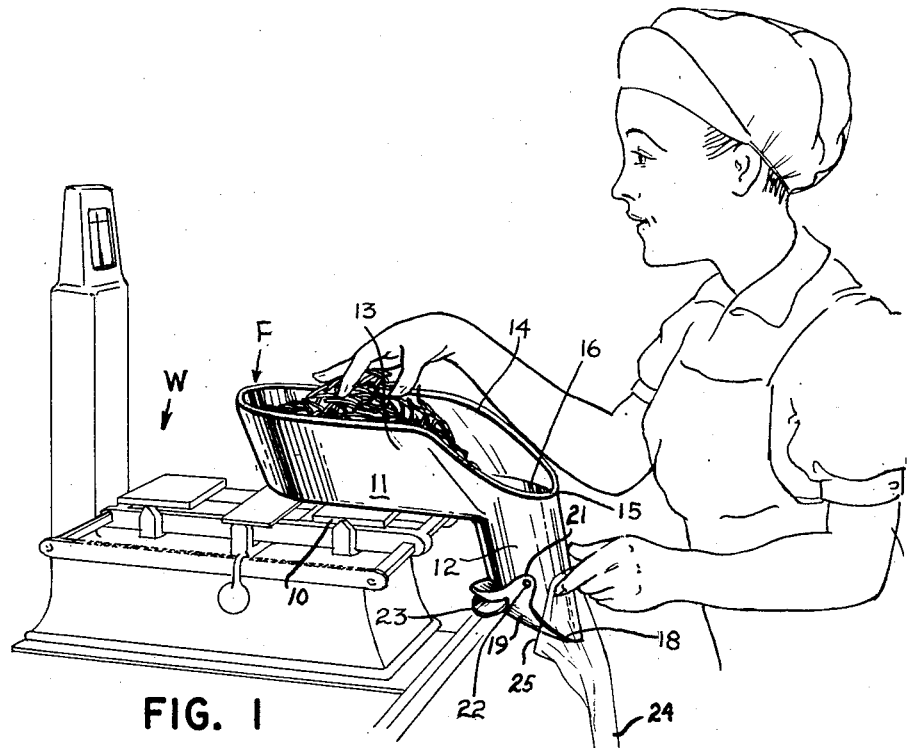
FIG. 1
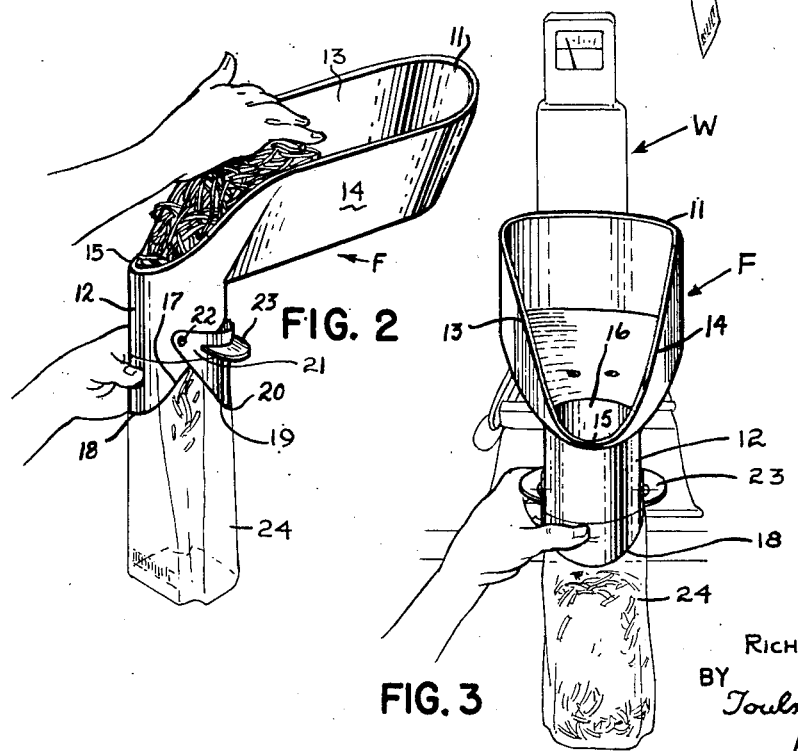
FIG. 2
FIG. 3
INVENTOR
RICHARD B. CROSSET
BY Toulmin & Toulmin
ATTORNEYS Patented Jan. 2, 1951

2,536,125

UNITED STATES PATENT OFFICE 2,536,125

WEIGHING FUNNEL

Richard Boyce Crosset, Cincinnati, Ohio, assignor to The Crosset Company, Cincinnati, Ohio, a partnership Application May 19, 1948, Serial No. 27,958

6 Claims. (Cl. 265—73)

This invention relates to a so-called weighing funnel and is concerned primarily with a funnel of this type which is readily adapted for use in filling bags and comparable packages.

At the present time, the practice of filling bags with a measured quantity of certain articles or material is becoming more and more widespread. Thus, if certain produce is to be merchandise, it is necessary that a predetermined quantity thereof be accurately measured such as on a weighing scale and then charged into a package of the bag type which is subsequently sealed and the goods are sold in this condition. It is evident that this practice essentially involves two operations, one the weighing or measuring of the goods, and the other the filling of the bags.

With the foregoing conditions in mind, the present invention has in view as its foremost objective the provision of a compound weighing funnel which includes, as essential elements, an open top receptacle or tray which is adapted to receive the goods to be weighed and, secondly, a discharge spout or funnel that is readily adaptable to be inserted into the mouth or neck of a bag.

In carrying out the foregoing idea in a practical embodiment, it is, of course, necessary or at least highly desirable to facilitate the bag filling operation. With this thought in mind, a further object of the invention is the provision of a weighing funnel of the type indicated which includes a funnel or spout having a discharge end which is expansible and contractable as occasion demands. When contracted, the spout is readily adapted for insertion into the mouth of a bag and when expanded the bag is engaged so as to grip the spout and establish the connection between the two.

Still another highly important object of the invention is the provision of a weighing funnel of the type aforesaid which includes a spout which carries a movable closure element. This closure element is preferably pivotally mounted on the spout and is so weighted and designed that under normal conditions, free of outside influences, it will be in a position closing the spout. However, it may be opened against the effect of gravity to open the spout and at the same time grip a bag which is engaged thereon.

Still another object of the invention is the provision of a weighing funnel of the type indicated which includes a spout having a movable closure element which cooperates with the spout when in closed position to define an arcuate edge which is readily adapted for insertion into the mouth of a bag. The closure member is formed with a rib which is adapted to function as an operating member or hand grip and which also serves as a counterbalance for holding the spout in closed position under the influence of gravity.

Various other more detailed objects and advantages of the invention such as arise in connection with carrying out the above noted ideas in a practical embodiment will in part become apparent and in part be hereinafter stated as the description of the invention proceeds.

The invention therefore comprises a weighing funnel consisting of an open weighing tray together with a spout in communication therewith and which spout has a lower open end that is normally closed by a pivotally mounted closure element, the closure element and spout in closed position defining an arcuate edge that is adapted for insertion into the mouth of a bag.

For a full and more complete understanding of the invention, reference may be had to the following description and accompanying drawing wherein:

Figure 1 is a perspective view of a weighing funnel which is designed in accordance with the precepts of this invention and showing the manner in which a bag is adapted to be positioned thereover.

Figure 2 is a perspective view comparable to Figure 1 but showing the closure member in open or extended position.

Figure 3 is a perspective view from the end of the tray showing the contents of the tray as discharged through the funnel into the bag.

Referring now to the drawing wherein like reference characters denote corresponding parts and first more particularly to Figure 1, a scale is indicated generally at W. This scale may be of any approved type and, as illustrated in the drawing, is shown as being a balance which will afford highly accurate weighing operations. Scale W includes a table 10 which is adapted to support the weighing funnel of this invention.

The funnel is referred to in its entirety by the reference character F and is shown as comprising a tray 11 and a spout 12 which is in communication therewith. It will be noted that the tray 11 has side walls 13 and 14 which converge toward the front end which is designated 15 and which pass about an opening 16 which constitutes the upper end of the spout 12.

The spout 12 is generally of cylindrical formation and its lower end is cut away on the bias or at an angle as represented at 17. This provides an arcuate edge at 18 for a purpose to be later described.

A closure member designated 19 has a shape which might be said to be complemental to the lower end of the spout 12. Thus, the closure member 19 has an arcuate edge at 20 which, when the closure member is in closed position, closely parallels the arcuate edge 18 thereof.

The closure member 19 is formed with a pair of ears at 21 which are disposed opposite to each other and which are pivotally connected to the spout 12 as indicated at 22. Closure member 19 also is formed with an outward extending rib 23 which performs two functions. In the first place it serves as a counterbalance or weight which maintains the closure member 19 in the closed position illustrated in Figure 1 and, secondly, is readily adapted to be engaged by the fingers of the operator to swing the closure member 19 about the pivots 22 into the open position depicted in Figure 2.

While the mode of operation of the above described weighing funnel is believed to be obvious, it may be briefly outlined by noting that the operator first places the certain amount of materials which are to be weighed into the tray 11, the scales W being employed to determine this exact amount. After the predetermined amount has been placed on the tray 11, a bag such as shown at 24 and which has an open mouth at 25 is slid over the engaging edges 18 and 20 of the spout 12 and closure member 19 respectively, this being depicted in Figure 1.

It is evident that this insertion of the edges 18 and 20 into the mouth 25 of the bag 24 is a simple and easy operation and the gradually diverging sides of these parts facilitates the complete insertion. After this has been done, the operator avails of the rib 23 as an operating member and swings the closure member 19 into the open position shown in Figure 2. In this position, the spout 12 and closure member 19 engage the inner surfaces of the bag 24 with considerable pressure, thus establishing friction which holds the bag in position.

The operator then pushes the contents of the tray 11 down to the opening 16 whereupon it passes through the spout 12 and out its open end into the bag 24.

While a preferred specific embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. A weighing funnel of the character described comprising an open top tray having a horizontal bottom adapted to rest on a scale platform and having its front side edges in converging relation, said bottom being formed with an opening at the front end, a vertically extending spout communicating with said opening and integrally connected to said tray, and a closure member pivotally supported on the lower end of said spout and normally closing the said lower end of said spout.

2. A weighing funnel of the character described comprising an open top tray having a horizontal bottom adapted to rest on a scale platform and having its front side edges in converging relation, said bottom being formed with an opening at the front end, a vertically extending substantially cylindrical spout communicating with said opening, said spout having its lower end cut away on the bias, a closure member pivotally carried by said spout, and counterbalanced to assume a closed position under gravity action.

3. A weighing funnel of the character described comprising an open top tray having a horizontal bottom adapted to rest on a scale platform and having its front side edges in coverging relation, said bottom being formed with an opening at the front end, a vertically extending spout communicating with said opening and having its lower end cut away at an angle to provide an arcuate edge, a closure member pivotally mounted on said spout and having an arcuate edge corresponding to the arcuate edge of said spout and adapted to engage therewith, so as to form a wedge-shaped end on the spout adapted for easy entry into the mouth of a bag, and means for normally maintaining said closure member in closed position.

4. A weighing funnel of the character described comprising an open top tray having a horizontal bottom adapted to rest on a scale platform and having its front side edges in converging relation, said bottom being formed with an opening at the front end, a vertically extending spout communicating with said opening and having its lower end being cut away so as to define an arcuate plane oblique to the axis of said spout, a closure member pivotally mounted on said spout and being arcuate so as to correspond to the arcuate edge of said spout and adapted to engage therewith to close the lower end of said spout, and an outwardly extending rib carried by said closure member functioning both as a counterbalance for maintaining the spout in closed position and as an operating member, said spout and closure member forming a wedge shape to slip into the mouth of a bag when said member is closed, and when said member is opened, serving to hold the said bag open.

5. A weighing funnel of the character described comprising an open top tray having a bottom adapted to assume a horizontal position, said bottom being formed with an opening at its front end, a spout integrally connected to said tray and communicating with said opening and extending downwardly, said spout having its lower end cut away at an angle to provide an arcuate edge, a closure member pivotally carried by said spout having an arcuate edge corresponding to the arcuate edge of said spout and adapted to engage therewith, and a part carried by said closure member and extending therefrom for manual engagement to move said member into open position, said part being so located and of sufficient weight to function as a counterbalance to maintain said closure member in closed position under the influence of gravity action.

6. A weighing funnel of the character described comprising an open-topped tray having a flat bottom adapted to rest on a scale platform in a horizontal position, a spout integrally connected to said tray at one end and in communication therewith and extending substantially vertically downwardly from the horizontal bottom of said tray, and a closure member movably mounted on the lower end of said spout and normally closing the said lower end of the spout.

RICHARD BOYCE CROSSET.

REFERENCES CITED

The following references are of record in the file of this patent:

UNITED STATES PATENTS

| Number | Name | Date |
| --- | --- | --- |
| 192,207 | Whyler | June 19, 1877 |
| 808,588 | Tracy | Dec. 26, 1905 |
| 1,287,023 | Hornung | Dec. 10, 1918 |
| 1,303,526 | Wilputte | May 13, 1919 |
| 2,192,982 | Meendsen | Mar. 12, 1940 |
| 2,408,906 | Bocchicchio | Oct. 8, 1946 |

FOREIGN PATENTS

| Number | Country | Date |
| --- | --- | --- |
| 463,064 | Great Britain | Mar. 22, 1937 |